United States Patent
Li et al.

(10) Patent No.: US 11,410,171 B2
(45) Date of Patent: Aug. 9, 2022

(54) BLOCKCHAIN CONSENSUS METHOD AND DEVICE AND ELECTRONIC EQUIPMENT

(71) Applicant: ALIPAY (HANGZHOU) INFORMATION TECHNOLOGY CO., LTD., Zhejiang (CN)

(72) Inventors: Kang Li, Hangzhou (CN); Fuxi Deng, Hangzhou (CN); Xiaojun Liao, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/348,265

(22) Filed: Jun. 15, 2021

(65) Prior Publication Data
US 2021/0312438 A1    Oct. 7, 2021

(30) Foreign Application Priority Data
Jul. 3, 2020    (CN) .......................... 202010630457.6

(51) Int. Cl.
*H04L 9/32* (2006.01)
*G06Q 20/38* (2012.01)
(Continued)

(52) U.S. Cl.
CPC ....... *G06Q 20/389* (2013.01); *G06F 11/1448* (2013.01); *G06F 11/1458* (2013.01);
(Continued)

(58) Field of Classification Search
CPC ............. G06F 11/1474; G06F 11/1458; G06F 16/2365; H04L 2209/38; H04L 9/3239
See application file for complete search history.

(56) References Cited

U.S. PATENT DOCUMENTS 10,204,341 B2    2/2019    Davis
10,230,530 B2    3/2019    Lancashire et al.
(Continued)

FOREIGN PATENT DOCUMENTS

CN    109087098 A    12/2018
CN    109886689 A    6/2019
(Continued)

OTHER PUBLICATIONS

Extended European Search Report for European Application No. 21181144.3 dated Nov. 9, 2021.
(Continued)

*Primary Examiner* — Marcin R Filipczyk

(57) ABSTRACT

Methods, systems, and devices, including computer programs encoded on computer storage media, for payment are provided. One of the methods includes: sending a consensus proposal for at least one pending-consensus transaction in a transaction pool of the consensus master node to a target consensus backup node of the blockchain, wherein the consensus proposal comprises a transaction hash list, and the transaction hash list comprises a transaction hash of the at least one pending-consensus transaction; matching the transaction hash in the consensus proposal with transactions in a transaction pool of the target consensus backup node; in response to the transaction hash being matched, obtaining, from the transaction pool of the target consensus backup node, transaction information of the matched at least one pending-consensus transaction; and executing a process of the consensus proposal based on the transaction information.

20 Claims, 3 Drawing Sheets

(51) Int. Cl.
  *G06F 11/14* (2006.01)
  *G06Q 20/40* (2012.01)
  *G06F 16/27* (2019.01)

(52) U.S. Cl.
  CPC ......... *G06F 16/275* (2019.01); *G06Q 20/401* (2013.01); *H04L 9/3239* (2013.01); *H04L 2209/38* (2013.01)

(56) References Cited

U.S. PATENT DOCUMENTS

| | | | |
|---|---|---|---|
| 10,291,413 | B2 | 5/2019 | Ramathal et al. |
| 10,298,405 | B2 | 5/2019 | Ramathal et al. |
| 10,360,191 | B2 | 7/2019 | Christidis et al. |
| 2017/0337534 | A1 | 11/2017 | Goeringer et al. |
| 2018/0225661 | A1 | 8/2018 | Russinovich et al. |
| 2018/0276668 | A1 | 9/2018 | Li |
| 2018/0285412 | A1 | 10/2018 | Zhuang |
| 2019/0020729 | A1 | 1/2019 | Chen et al. |
| 2019/0034465 | A1 | 1/2019 | Shimamura |
| 2019/0068380 | A1 | 2/2019 | Fang |
| 2019/0278666 | A1 | 9/2019 | Lin et al. |
| 2019/0288847 | A1* | 9/2019 | Beckmann .......... G06F 16/2255 |
| 2019/0324867 | A1 | 10/2019 | Tang |
| 2019/0332586 | A1 | 10/2019 | Wang |
| 2019/0342422 | A1 | 11/2019 | Li |
| 2020/0127945 | A1* | 4/2020 | Yang ..................... H04L 9/3239 |
| 2020/0175506 | A1* | 6/2020 | Snow ..................... H04L 9/3239 |
| 2021/0256007 | A1* | 8/2021 | Wu ...................... H04L 41/0663 |

FOREIGN PATENT DOCUMENTS

| | | |
|---|---|---|
| CN | 110169015 A | 8/2019 |
| CN | 110691077 A | 1/2020 |
| CN | 111130801 A | 5/2020 |

OTHER PUBLICATIONS

First Search for Chinese Application No. 202010630457.6 dated Aug. 12, 2020.
Supplementary Search for Chinese Application No. 202010630457.6 dated Sep. 9, 2020.

* cited by examiner

BLOCKCHAIN CONSENSUS METHOD AND DEVICE AND ELECTRONIC EQUIPMENT

CROSS REFERENCE TO RELATED APPLICATIONS

This application claims priority to Chinese Patent Application No. 202010630457.6, filed on Jul. 3, 2020. The entire content of the above referenced application is incorporated herein by reference.

TECHNICAL FIELD

This specification relates to the field of blockchain technology, and in particular, to a blockchain consensus method, a blockchain consensus device, and an electronic equipment.

BACKGROUND

With the development of information technologies, the blockchain technology has gained its popularity because of its advantages such as openness, inalterability, decentralization, etc. In current blockchain technology, a transaction initiated by a client can be chained only after all consensus nodes in the blockchain reach a consensus. A proposal of the consensus is initiated by a consensus master node of the blockchain. The consensus master node sends transaction information of a pending-consensus transaction to consensus backup nodes. After receiving the transaction information, the consensus backup nodes perform a consensus check on the pending-consensus transaction to decide whether to reach a proposal.

At present, when there are many pending-consensus transactions in a consensus proposal, the data amount of transaction information that the consensus master node needs to send will increase accordingly, thereby consuming much time for transmission and analysis, which in turn seriously affects the consensus efficiency. In view of the above, a technical solution for improving the consensus efficiency of the blockchain is urgently desired.

SUMMARY

One object of the embodiments of this specification is to provide a blockchain consensus method, a blockchain consensus device, and an electronic equipment, which can improve the consensus execution efficiency of the blockchain.

To achieve the above-described object, the embodiments of this specification are implemented as follows.

In a first aspect, a blockchain consensus method is provided, comprising: sending, by a consensus master node of a blockchain, a consensus proposal for at least one pending-consensus transaction in a transaction pool of the consensus master node to a target consensus backup node of the blockchain, wherein the consensus proposal comprises a transaction hash list, and the transaction hash list comprises a transaction hash of the at least one pending-consensus transaction; matching, by the target consensus backup node of the blockchain, the transaction hash in the consensus proposal with transactions in a transaction pool of the target consensus backup node; in response to the transaction hash being matched, obtaining, by the target consensus backup node of the blockchain from the transaction pool of the target consensus backup node, transaction information of the matched at least one pending-consensus transaction; and executing, by the target consensus backup node of the blockchain, a process of the consensus proposal based on the transaction information.

In some embodiments, the method further comprises: in response to the transaction hash not being matched, iteratively performing, by the target consensus backup node of the blockchain, a waiting-matching process for the at least one pending-consensus transaction to be synchronized to the transaction pool of the target consensus backup node.

In some embodiments, the method further comprises: in response to the transaction hash not being matched, sending, by the target consensus backup node of the blockchain to the consensus master node, a transaction synchronization request, wherein the transaction synchronization request comprises the transaction hash not matched in the transaction pool of the target consensus backup node; receiving, by the target consensus backup node of the blockchain, a transaction synchronization response from the consensus master node, wherein the transaction synchronization response comprises transaction information of a target pending-consensus transaction from the consensus master node; validating, by the target consensus backup node of the blockchain, the transaction information of the target pending-consensus transaction in the transaction synchronization response; adding, by the target consensus backup node of the blockchain, the transaction information of the target pending-consensus transaction to the transaction pool of the target consensus backup node; and obtaining, by the target consensus backup node of the blockchain from the transaction pool of the target consensus backup node, the pending-consensus transaction corresponding to the transaction hash in the transaction hash list.

In some embodiments, the iterative waiting-matching process comprises: delaying for a rematch time interval before matching again, wherein the iterative waiting-matching process performs the matching for a rematch count.

In some embodiments, the method further comprises marking, by the target consensus backup node of the blockchain, a transaction hash of a matched pending-consensus transaction in the transaction hash list, wherein the matching the transaction hash of the at least one pending-consensus transaction comprises: matching, from the transaction pool of the target consensus backup node of the blockchain, only pending-consensus transactions corresponding to unmarked transaction hashes in the transaction hash list.

In some embodiments, the method further comprises: after adding, by the target consensus backup node of the blockchain, a new transactions to the transaction pool of the target consensus backup node, calculating a transaction hashes of the new transactions based on a transaction hash calculation logic; and storing, by the target consensus backup node of the blockchain, a mapping relationships between the new transactions and the calculated transaction hashes; wherein the matching the transaction hash in the consensus proposal with transactions in a transaction pool of the target consensus backup node comprises: matching the transaction hash list and the stored mapping relationships for obtaining the at least one pending-consensus transaction.

In some embodiments, the method further comprises: after adding, by the target consensus backup node of the blockchain, new transactions to the transaction pool of the target consensus backup node, calculating transaction hashes of the new transactions based on a transaction hash calculation logic; and storing, by the target consensus backup node of the blockchain, mapping relationships between the new transactions and the calculated transaction hashes; wherein the matching the transaction hash in the consensus proposal with transactions in a transaction pool of the target consensus backup node comprises: matching the transaction hash list and the stored mapping relationships for obtaining the at least one pending-consensus transaction.

In some embodiments, the consensus proposal reaches a consensus based on the Practical Byzantine Fault Tolerance algorithm.

In some embodiments, the transaction hash list is sent to the target consensus backup node by the consensus master node through a pre-prepare message in a pre-prepare stage of the consensus proposal.

In a second aspect, a blockchain-based system comprising a consensus master node and a target consensus backup node for implementing a consensus protocol is provided. The nodes comprise one or more processors and one or more non-transitory computer-readable memories coupled to the one or more processors and configured with instructions executable by the one or more processors to cause the system to perform operations comprising in response to the transaction hash not being matched, sending, by the target consensus backup node to the consensus master node, a transaction synchronization request, wherein the transaction synchronization request comprises the transaction hash not matched in the transaction pool of the target consensus backup node; receiving, by the target consensus backup node, a transaction synchronization response from the consensus master node, wherein the transaction synchronization response comprises transaction information of a target pending-consensus transaction from the consensus master node; validating, by the target consensus backup node, the transaction information of the target pending-consensus transaction in the transaction synchronization response; adding, by the target consensus backup node, the transaction information of the target pending-consensus transaction to the transaction pool of the target consensus backup node; and obtaining, by the target consensus backup node from the transaction pool of the target consensus backup node, the pending-consensus transaction corresponding to transaction hash in the transaction hash list.

In a third aspect, a non-transitory computer-readable storage medium is provided. The storage medium is configured with instructions executable by one or more processors of a consensus master node and a target consensus backup node of a blockchain to cause the one or more processors to perform operations comprising sending, by the consensus master node, a consensus proposal for at least one pending-consensus transaction in a transaction pool of the consensus master node to a target consensus backup node, wherein the consensus proposal comprises a transaction hash list, and the transaction hash list comprises a transaction hash of the at least one pending-consensus transaction; matching, by the target consensus backup node, the transaction hash in the consensus proposal with transactions in a transaction pool of the target consensus backup node; in response to the transaction hash being matched, obtaining, by the target consensus backup node from the transaction pool of the target consensus backup node, transaction information of the matched at least one pending-consensus transaction; and executing, by the target consensus backup node, a process of the consensus proposal based on the transaction information.

In the solutions of the embodiments of this specification, a consensus master node sends to a consensus backup node (also called a target consensus backup node) a transaction hash of a pending-consensus transaction in a consensus stage, replacing the original method of sending transaction information of the pending-consensus transaction to the consensus backup node. All transaction backup nodes may autonomously match and select transaction information of the pending-consensus transaction from respective transaction pools based on the transaction hash, thereby completing a consensus process. Since the data amount of the transaction hash is smaller than that of transaction information, the solutions of the embodiments of this specification may significantly reduce the time for data transmission and data analysis in the consensus process, thereby improving the consensus efficiency. In addition, the embodiments described herein may face the issue when the consensus backup node fails to match the received transaction hash with any transaction within its transaction pool. The failure to match the transaction hash may be caused by various reasons, such as the pending-census transaction has not been synchronized to the consensus backup node yet. In some embodiments, by combining an iterative waiting-matching strategy and selectively requesting the corresponding transaction information from the consensus master node, the proposed solution guarantees that the consensus process can be performed by the consensus backup nodes with a minimum data transfer cost. For instance, only the transactions that are not synchronized to the consensus backup nodes need to be requested and transferred from the consensus master node.

BRIEF DESCRIPTION OF THE DRAWINGS

In order to more clearly describe the technical solutions of the embodiments of this specification or the current technologies, the accompanying drawings used for the description of the embodiments or the current technologies are briefly described below. Apparently, the accompanying drawings described below are only some embodiments recorded in this specification. One of ordinary skill in the art may obtain other drawings according to these accompanying drawings without creative efforts.

DETAILED DESCRIPTION

For better understanding of the technical solutions of this specification by those skilled in the art, a clear and complete description of the technical solutions of the embodiments of this specification is made below in conjunction with the accompanying drawings in the embodiments of this specification. Apparently, only some, not all of the embodiments of this specification are described. All other embodiments obtained by one of ordinary skill in the art without creative efforts based on the embodiments of this specification shall fall within the protection scope of this specification.

As mentioned earlier, in current blockchain technology, a blockchain transaction initiated by a client become a part of the blockchain only after all consensus nodes in the blockchain reach a consensus. In the consensus process, a consensus master node needs to send transaction information of a pending-consensus transaction to consensus backup nodes for a consensus check. At present, when there are a large number of pending-consensus transactions in a consensus proposal, the data amount of transaction information that the consensus master node needs to send will increase accordingly, thereby consuming much time for transmission and analysis, which in turn seriously affects the consensus efficiency.

To address this technical problem, one object of this specification is to provide a technical solution to achieve a highly efficient consensus execution.

Figure 1:
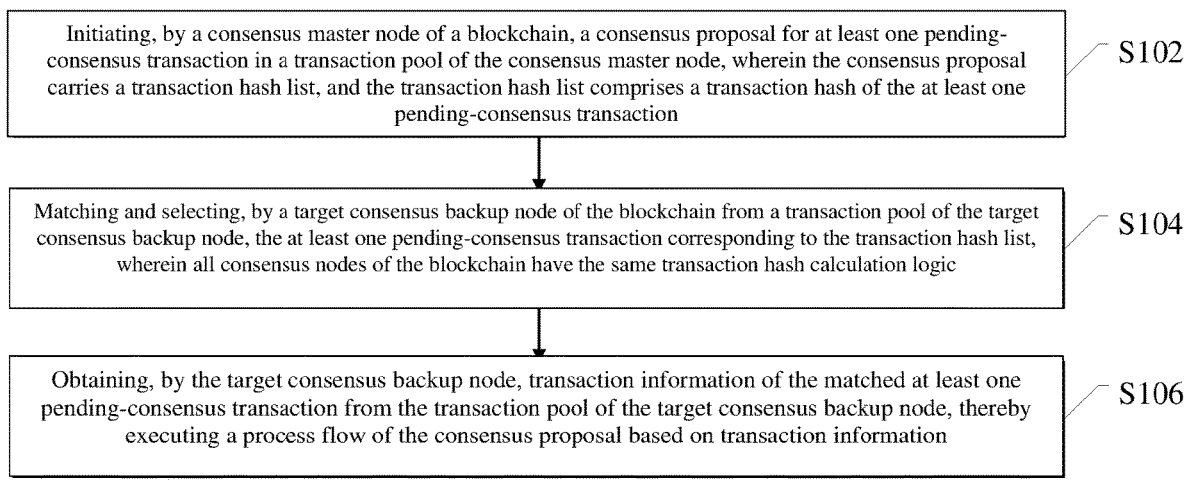
FIG. 1 is a first process diagram of a blockchain consensus method according to the embodiments of this specification.

FIG. 1 is a process diagram of a blockchain consensus method according to the embodiments of this specification. The method shown in FIG. 1 may be executed by a corresponding device described below. The method may include multiple steps illustrated as below.

Step S102 includes initiating, by a consensus master node of a blockchain, a consensus proposal for at least one pending-consensus transaction in a transaction pool of the consensus master node, wherein the consensus proposal carries a transaction hash list, and the transaction hash list comprises a transaction hash of the at least one pending-consensus transaction. Here, the "initiating" may include both generating the consensus proposal and sending it to the consensus backup nodes for consensus check.

In comparison to traditional consensus solutions, the consensus proposal carries a transaction information list, and the transaction information list carries transaction information of all pending-consensus transactions in this consensus proposal. In general, when the number of the pending-consensus transactions reaches 1,000, the data amount of the transaction information list is as high as about 2M, which for a blockchain, is a relatively large data amount.

In contrast, the consensus master node in step S102 uses the transaction hash list instead of a traditional transaction information list (excluding the transaction information of the pending-consensus transactions), which means that the consensus master node informs a consensus backup node of a pending-consensus transactions of this consensus proposal through a transaction hash. The data amount corresponding to the transaction hash is much smaller than that corresponding to transaction information.

Step S104 includes matching and selecting, by a target consensus backup node of the blockchain from a transaction pool of the target consensus backup node, the at least one pending-consensus transaction based on the transaction hash in the transaction hash list. For example, the target consensus backup node of the blockchain may determine whether the transaction hash matches a transaction hash calculated based on any of the transactions in the transaction pool of the target consensus backup node. In some embodiments, all consensus nodes of the blockchain have the same transaction hash calculation logic. That is, the transaction hashes calculated by all consensus nodes for the same transaction are consistent. As a result, all consensus backup nodes may match and select a pending-consensus transaction consistent with the consensus master node based on the transaction hash in the transaction hash list.

Step S106 includes obtaining, by the target consensus backup node, transaction information of the matched at least one pending-consensus transaction from the transaction pool of the target consensus backup node, and executing a process of the consensus proposal based on transaction information.

Note that under normal circumstances, all consensus nodes of the blockchain will independently initiate a legality check on a transaction initiated by a client, and add the transaction passing the legality check to the transaction pool thereof. As a result, the consensus backup node has the ability to obtain transaction information of a pending-consensus transaction from the transaction pool thereof, instead of having the consensus master node sending transaction information to the consensus backup node.

This way, the consensus master node sends to the consensus backup node a transaction hash of a pending-consensus transaction in the consensus stage, replacing the existing method of sending to the consensus backup node transaction information of the pending-consensus transaction. All transaction backup nodes may autonomously match and select transaction information of the pending-consensus transaction from respective transaction pools based on the transaction hash, thereby completing a consensus process. Since the data amount of the transaction hash is smaller than that of transaction information, the solutions of the embodiments of this specification may significantly reduce the time for data transmission and data analysis in the consensus process, thereby improving the consensus efficiency.

In practical use, the client will access a node in the blockchain to initiate a transaction. After this node performs a successful legality check on the transaction, the node will add the transaction to the transaction pool thereof, and then forward the transaction to other nodes, causing other nodes to perform a legality check on the transaction. Similarly, after performing a successful legality check on the transaction, other nodes will add the transaction to respective transaction pools.

Thus, the transactions in the transaction pools of all nodes in the blockchain are not all synchronous. It means that in a very rare case, after a consensus master node initiates a consensus proposal for a pending-consensus transaction in the transaction pool thereof, the pending-consensus transaction may not yet be added to the transaction pools of some consensus backup nodes. Thus, even if a transaction hash list sent by the consensus master node is obtained, a consensus backup node would still fail to match and select the pending-consensus transaction from the transaction pool thereof, nor would it be able to obtain transaction information of the pending-consensus transaction, which makes a consensus flow unable to proceed.

To solve this problem, in Step S104, if a target consensus backup node fails to match and select, from a transaction pool of the target consensus backup node, a target pending-consensus transaction (not limited to one) based on the transaction hashes in the transaction hash list, the target consensus backup node may wait until the transaction pool of the target consensus backup node is updated based on a preset delay strategy, and then rematches and reselects, from the transaction pool of the target consensus backup node, the target pending-consensus transaction corresponding to the transaction hash list.

In some embodiments, this iterative "waiting-matching" process may be configured based on a preset rematch count and a preset rematch time interval. As an example, assuming that the rematch count is 3 and the rematch time interval is 10 ms. Then the target consensus backup node waits for 10 ms after failing to match and select, from the transaction pool of the target consensus backup node, the target pending-consensus transaction corresponding to the transaction hash list, and then retries to match and select the target pending-consensus transaction from the transaction pool of the target consensus backup node. If the matching still fails, the target consensus backup node waits for another 10 ms and retries to match and select the target pending-consensus transaction from the transaction pool of the target consensus backup node until the rematch count reaches 3. This iterative "waiting-matching" process may allow the target pending-consensus transaction to be synchronized to the transaction pool of the target consensus backup node.

In order to further ensure a successful execution of the consensus proposal, if the target consensus backup node still fails to identify, after performing the iterative "waiting-matching" process, the target pending-consensus transaction from the transaction pool of the target consensus backup node, the target consensus backup node may request the transaction information of the target pending-consensus transaction from the consensus master node. The consensus master node only initiates a consensus proposal for a transaction that is already in the transaction pool of the consensus master node. The scenario in which the consensus master node does not have transaction information of the target pending-consensus transaction does not exist.

For example, when the target consensus backup node needs to request transaction information of the target pending-consensus transaction from the consensus master node, the target consensus backup node may send a transaction synchronization request message to the consensus master node. The transaction synchronization request message carries the transaction hash of the target pending-consensus transaction that the target consensus backup node fails to match and select from the transaction pool of the target consensus backup node.

Then, the consensus master node searches for the transaction information of the target pending-consensus transaction in the transaction pool of the consensus master node based on the transaction hash in the transaction synchronization request, and feeds back transaction information of the target pending-consensus transaction to the target consensus backup node through a transaction synchronization response message.

After receiving the transaction synchronization response message, the target consensus backup node first performs an account legality check on the target pending-consensus transaction based on the transaction information of the target pending-consensus transaction in the transaction synchronization response message. In some embodiments, the IP address of a client that initiates the transaction is verified. After the account legality check is performed and successful, the transaction information of the target pending-consensus transaction may be added to the transaction pool of the target consensus backup node. Then, the target consensus backup node matches and selects the target pending-consensus transaction from the transaction pool of the target consensus backup node. The match may not be deemed as a successful match when the target consensus backup node does not match and select the pending-consensus transaction corresponding to the transaction hash list from its own transaction pool.

The above-described target pending-consensus transaction only includes the transaction requested by the target consensus backup node, and does not include all pending-consensus transactions of this consensus proposal. Therefore, even if the consensus master node sends transaction information of the target pending-consensus transaction to the consensus backup node, the consumed time for transmission and analysis is less than that for sending transaction information of all pending-consensus transactions to the target consensus backup node. In addition, the consensus master node only needs to send the transaction information to the requesting node (e.g., the target consensus backup node) rather than all consensus backup nodes, which significantly reduces the data traffic in the blockchain network in comparison with the existing solutions.

In some embodiments, other features may be incorporated into the technology of the above-described solution to further improve the consensus efficiency.

As an example, when the target consensus backup node fails to match and select all pending-consensus transactions corresponding to the transaction hash list from its own transaction pool at one try, the target consensus backup node may mark the transaction hash of the matched pending-consensus transaction in the transaction hash list. In subsequent rematch, the target consensus backup node only performs matching and selecting, from the transaction pool of the target consensus backup node, for a pending-consensus transaction corresponding to an unmarked transaction hash in the transaction hash list, thereby achieving the goal of saving the matching time.

As another example, after adding a new transaction to a transaction pool of a target consensus node, the target consensus node may pre-calculate a transaction hash of the new transaction based on a transaction hash calculation logic, and store a mapping relationship between the new transaction and the corresponding transaction hash. In subsequent execution of a consensus process for the new transaction, a target consensus backup node may directly match and select, from a transaction pool of the target consensus backup node, the new transaction corresponding to the transaction hash list based on the pre-stored mapping relationship, thereby achieving the goal of saving the matching time. In some embodiments, when the new transaction is successfully added to the blockchain after a consensus regarding the new transaction is reached, the target consensus backup node may delete the pre-stored mapping relationship between the new transaction and corresponding transaction hash, in order to clear up the storage space.

The method according to the embodiments of this specification is described below as an example in conjunction with different implementations.

Implementation 1

Figure 2:
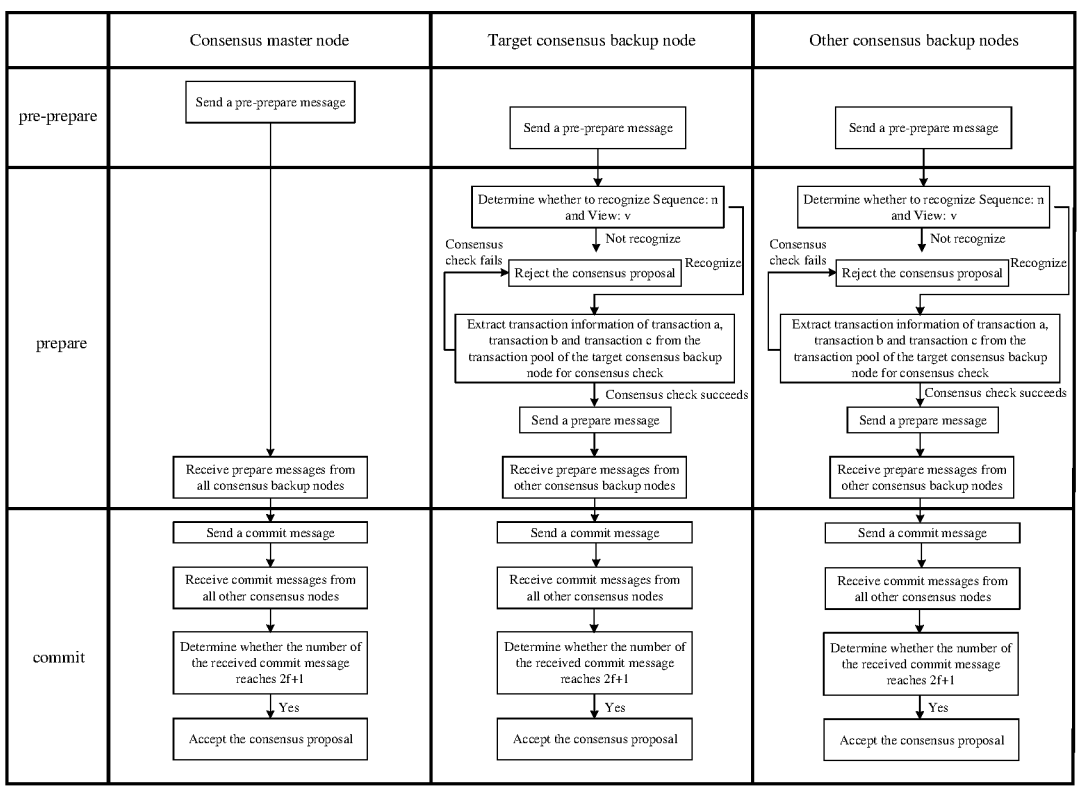
FIG. 2 is a second process diagram of a blockchain consensus method according to the embodiments of this specification.

In implementation 1, replica nodes (also referred to as copies, which are nodes that establish a blockchain distributed system, including a consensus master node and consensus backup nodes) of a blockchain performs consensus based on Practical Byzantine Fault Tolerance (PFBT) (or performs consensus based on other algorithms, which are not limited to PFBT). A consensus process corresponding to PFBT is shown in FIG. 2, including a pre-prepare stage, a prepare stage, and a commit stage.

In some embodiments, the consensus master node of the blockchain initiates a consensus proposal, enters the pre-prepare stage of PFBT, and broadcasts a pre-prepare message to all consensus backup nodes, wherein the pre-prepare message carries information such as a sequence number (Sequence): index of this proposal, a view value (View): v, a transaction hash list, etc. Here, the transaction hash list includes the transaction hashes of all pending-consensus transactions in this consensus proposal. In implementation 1, it is assumed that the pending-consensus transactions include: transaction a, transaction b and transaction c.

After receiving the pre-prepare message, the target consensus backup node (representing any consensus backup node) of the blockchain first determines whether Sequence: n and View: v in the pre-prepare message are recognized. If not, the consensus proposal is rejected. If so, the pre-prepare message is accepted, and the process proceeds to the following steps.

The target consensus backup node matches and selects transaction a, transaction b, and transaction c from a transaction pool of the target consensus backup node based on the transaction hashes of transaction a, transaction b, and transaction c in the transaction hash list. For example, in the matching process, the target consensus backup node may respectively perform reverse calculation of the transaction hashes in the transaction hash list based on a transaction hash calculation logic agreed by the replica nodes, and obtain summary information of transaction a, transaction b, and transaction c. Afterwards, based on summary information of transaction a, transaction b, and transaction c, the target consensus backup node searches its own transaction pool in order to match and select transaction a, transaction b, and transaction c from the transaction pool.

After matching transaction a, transaction b, and transaction c from the transaction pool of the target consensus backup node, the target consensus backup node extracts transaction information of transaction a, transaction b, and transaction c from the transaction pool. Then, the target consensus backup node performs a consensus check on transaction information of transaction a, transaction b, and transaction c based on a consensus check rule. The consensus check method may be set flexibly, which will not be elaborated further with examples herein.

If the consensus check succeeds, the target consensus backup node enters the prepare stage, determines that the state on replica is prepared, and adds the pre-prepare message to local Log, and sends a prepare message to other replica nodes.

After all replica nodes enter the prepared state, each replica node sends a commit message to other replica nodes, and adds the commit message it sends to local Log (representing its recognition). When a replica node finds that a quorum (a quorum is a set of a certain number of replicas required to ensure the consistency requirement and fault tolerance requirement of all replica data) agrees on the assignment of Sequence: n, the replica node will broadcast a commit message to all other replica nodes. At the same time, the replica node will also receive the commit messages from other replica nodes. If a replica node receives 2f+1 (f is the number of presumed malicious nodes in a union chain) commit messages (including the one it sends, and the commit messages from different nodes carrying the same Sequence: n and View: v), then the replica node may obtain a committed certificate, indicating the consensus proposal reaches a committed state on this replica node. Through this replica node, the request already reaches a prepared state with a quorum, namely, all replica nodes of the same quorum agree on the assignment of Sequence: n. When a replica node is in the committed state, it accepts the consensus proposal.

Implementation 2

In implementation 2, the replica nodes of a blockchain reach a consensus based on PFBT, and a consensus process corresponding to PFBT includes a pre-prepare stage, a prepare stage, and a commit stage.

In some embodiments, a consensus master node of the blockchain initiates a consensus proposal, enters a pre-prepare stage of PFBT, and broadcasts a pre-prepare message to each consensus backup node, wherein the pre-prepare message carries the information such as Sequence: n, View: v, and a transaction hash list. Here, the transaction hash list includes the transaction hashes of all pending-consensus transactions in this consensus proposal. In the implementation manner 1, it is assumed that the pending-consensus transactions include: transaction a, transaction b, and transaction c.

After receiving the pre-prepare message, a target consensus backup node of the blockchain first determines whether the Sequence: n and View: v in the pre-prepare message are recognized. If not, the consensus proposal is rejected. If so, the pre-prepare message is accepted, and the process proceeds to the following steps.

Based on the transaction hashes of transaction a, transaction b and transaction c in the transaction hash list, the target consensus backup node only matches and selects transaction a from a transaction pool of the target consensus backup node. At this point, it means that transaction b and transaction c have not yet been synchronized to the transaction pool of the target consensus backup node, then the target consensus backup node may wait for 3 ms, and rematch and reselect transaction b and transaction c from the transaction pool of the target consensus backup node.

Assuming that transaction b is re-matched and selected from the transaction pool of the target consensus backup node, but transaction c is still not matched and selected, then the target consensus backup node may wait for another 3 ms, and try again to match and select transaction c from the transaction pool of the target consensus backup node.

If transaction c is still not matched and selected, the target consensus backup node sends the transaction hash of the matched transaction c in the transaction hash list to the consensus master node; and the consensus master node matches and obtains transaction information of transaction c from a transaction pool of the consensus master node based on the transaction hash of transaction c, and feeds back transaction information of transaction c to the target consensus backup node.

After obtaining transaction information of transaction c through the consensus master node, the target consensus backup node performs account legality check based on transaction information of transaction c. This account legality check is different from subsequent consensus check of a consensus node, and is only intended to verify whether transaction c can be added to the transaction pool; and if transaction c passes the account legality check from the target consensus backup node, the target consensus backup node adds transaction c to the transaction pool of the target consensus backup node. Then, the target consensus backup node re-matches the transaction hash corresponding to transaction c in the transaction hash list with the transaction pool of the target consensus backup node.

After matching and selecting transaction a, transaction b, and transaction c from the transaction pool of the target consensus backup node, the target consensus backup node further extracts transaction information of transaction a, transaction b, and transaction c from the transaction pool. Then, the target consensus backup node performs a consensus check on transaction information of transaction a, transaction b, and transaction c based on its consensus check rules, and determines whether transaction a, transaction b, and transaction c are legal at a transaction level.

If the consensus check is successful, the target consensus backup node enters the prepare stage, determines that the state on replica is prepared, and adds the pre-prepare message to local Log, and sends a prepare message to other replica nodes.

After all replica nodes enter the prepared state, each replica node sends a commit message to other replica nodes, and adds the commit message it sends to local Log (representing its recognition). When a replica node finds that a quorum (a quorum is a set of a certain number of replicas required to ensure the consistency requirement and fault tolerance requirement of all replica data) agrees on the assignment of Sequence: n, the replica node will broadcast a commit message to all other replica nodes. At the same time, the replica node will also receive the commit messages from other replica nodes. If a replica node receives 2f+1 (f is the number of evil nodes in a union chain) commit messages (including the one it sends, and the commit messages from different nodes carrying the same Sequence: n and View: v), then the replica node possesses a certificate named committed certificate, and the consensus proposal reaches a committed state on this replica node. Now, it can be confirmed, only through this replica node, that the request already reaches a prepared state in a quorum, namely, all replica nodes of the same quorum agree on the assignment of Sequence: n. When a replica node is in the committed state, it accepts the consensus proposal.

The above-described implementation manners are only used for the description of the method according to the embodiments of this specification. It should be understood that appropriate changes may be made without departing from the above-described principles, and these changes shall also be considered to be within the protection scope of the embodiments of this specification. In some embodiments, after obtaining a hash list from the pre-prepare message, the consensus backup node may also obtain transaction information of the pending-consensus transaction from local transaction pool in the pre-prepare stage or the committed stage, and complete relevant consensus check.

Figure 3:
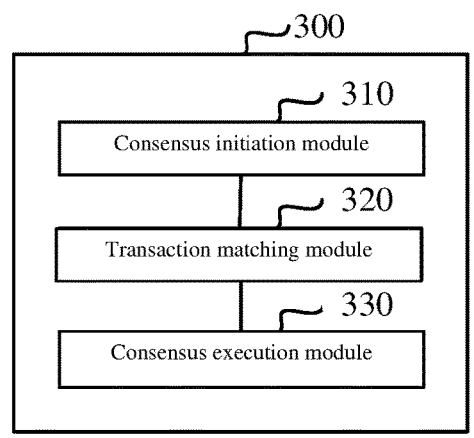
FIG. 3 is a structural diagram of a blockchain consensus device according to the embodiments of this specification.

Corresponding to the above-described method, as shown in FIG. 3, the embodiments of this specification also provide a blockchain consensus device 300, comprising: a consensus initiation module 310, configured to initiate, based on a consensus master node of a blockchain, a consensus proposal for at least one pending-consensus transaction in a transaction pool of the consensus master node, wherein the consensus proposal carries a transaction hash list, and the transaction hash list comprises a transaction hash of the at least one pending-consensus transaction; a transaction matching module 320, configured to match and select, based on a target consensus backup node of the blockchain, the at least one pending-consensus transaction corresponding to the transaction hash list from a transaction pool of the target consensus backup node, wherein all consensus nodes of the blockchain have the same transaction hash calculation logic; and a consensus execution module 330, configured to obtain, based on the target consensus backup node, transaction information of the matched at least one pending-consensus transaction from the transaction pool of the target consensus backup node, thereby executing a process of the consensus proposal based on the transaction information.

In the blockchain consensus device shown in FIG. 3, the consensus master node sends the transaction hash of the pending-consensus transaction to a consensus backup node in a consensus stage, replacing the original method of sending transaction information of the pending-consensus transaction to the consensus backup node. All transaction backup nodes may autonomously match and select transaction information of the pending-consensus transaction from respective transaction pools based on the transaction hash, thereby completing a consensus process. Since the data amount of the transaction hash is smaller than that of transaction information, the solutions of the embodiments of this specification may significantly reduce the time for data transmission and data analysis in the consensus process, thereby improving the consensus efficiency.

In some embodiments, before the step of executing a processing logic of the consensus proposal based on the transaction information, if the transaction matching module 320 fails to match and select, based on a target consensus backup node, a target pending-consensus transaction corresponding to the transaction hash list from a transaction pool of the target consensus backup node, it may wait until the transaction pool of the target consensus backup node is updated based on a preset delay strategy, and rematch and reselect the target pending-consensus transaction corresponding to the transaction hash list from the transaction pool of the target consensus backup node.

In some embodiments, before the step of executing a processing logic of the consensus proposal based on the transaction information, if the transaction matching module 320 still fails to match and select, based on the target consensus backup node and the delay strategy, the target pending-consensus transaction corresponding to the transaction hash list from the transaction pool of the target consensus backup node, it may request to obtain the information of the target pending-consensus transaction from the consensus master node based on the target consensus backup node. For example, the transaction matching module 320 may send a transaction synchronization request message to the consensus master node based on the target consensus backup node, wherein the transaction synchronization request message carries the transaction hash of the target pending-consensus transaction that fails to be matched and selected from the transaction pool of the target consensus backup node. Then, the transaction matching module 320 receives, based on the target consensus backup node, a transaction synchronization response message fed back by the consensus master node, wherein the transaction synchronization response message carries transaction information of the target pending-consensus transaction provided by the consensus master node. Then, the transaction matching module 320 performs a legality check on the target pending-consensus transaction based on the target consensus backup node and transaction information of the target pending-consensus transaction in the transaction synchronization response message. After the legality check is performed and successful, transaction information of the target pending-consensus transaction is added to the transaction pool of the target consensus backup node. Finally, the transaction matching module 320 matches and selects, based on a consensus backup node of the blockchain, the target pending-consensus transaction corresponding to the transaction hash list from the transaction pool of the target consensus backup node.

Here, the above-described delay strategy may include, but is not limited to: a rematch count and a rematch time interval.

In some embodiments, the transaction matching module 320 may mark, based on the target consensus backup node, the transaction hash of the matched pending-consensus transaction in the transaction hash list. Here, the transaction matching module 320 only matches and selects, based on the target consensus backup node, a pending-consensus transaction corresponding to an unmarked transaction hash in the transaction hash list from the transaction pool of the target consensus backup node.

In some embodiments, after the target consensus node adds a new transaction to the transaction pool of the target consensus node, the transaction matching module 320 may calculate a transaction hash of the new transaction based on the transaction hash calculation logic, and stores a mapping relationship between the new transaction and the corresponding transaction hash, to directly match and select, based on the pre-stored mapping relationship, the at least one pending-consensus transaction corresponding to the transaction hash list from the transaction pool of the target consensus backup node.

In some embodiments, the transaction hash list is sent to the target consensus backup node by the consensus master node through a pre-prepare message in a pre-prepare stage of the consensus proposal.

Apparently, the blockchain consensus device of the embodiments of this specification may serve as an execution entity of the blockchain consensus method shown in FIG. 1, and thus can achieve the functions of the blockchain consensus method shown in FIGS. 1 and 2. As the principles are identical, the blockchain consensus device will not be elaborated further herein.

Figure 4:
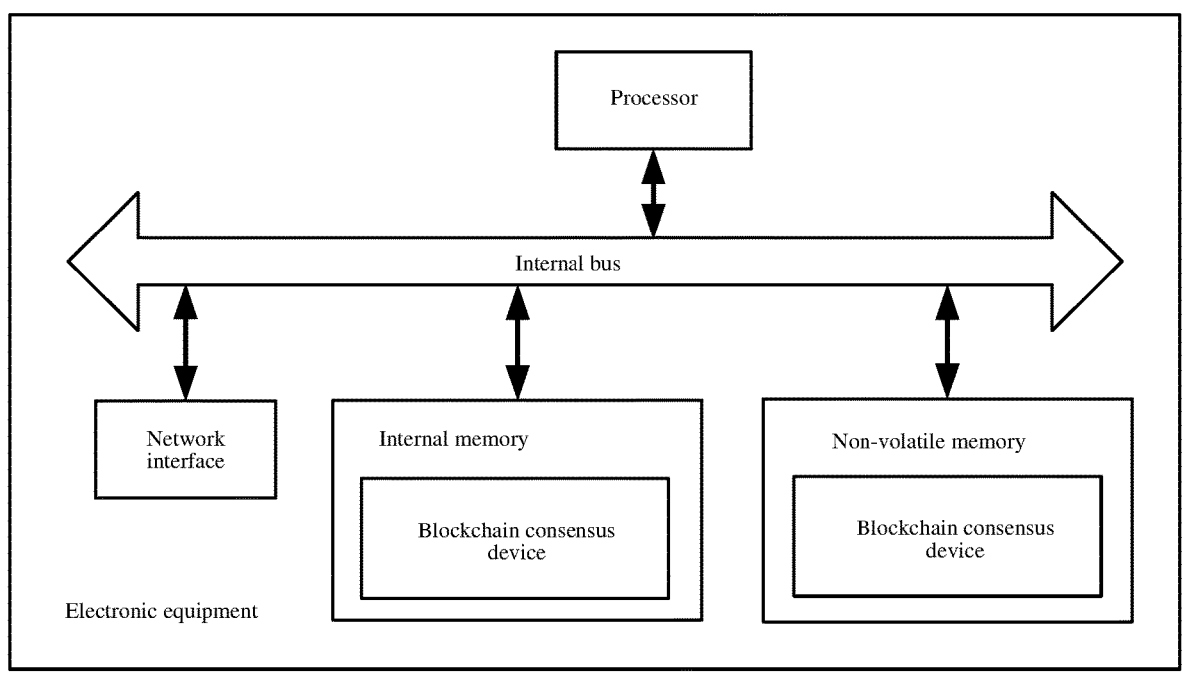
FIG. 4 is a structural diagram of an electronic equipment according to the embodiments of this specification.

FIG. 4 is a structural diagram of an electronic equipment according to an embodiment of this specification. Referring to FIG. 4, at a hardware level, the electronic equipment includes a processor, and optionally further includes an internal bus, a network interface, and a memory. Here, the memory may include an internal memory such as a high-speed Random-Access Memory (RAM), and may also include a non-volatile memory such as at least one disk memory. The electronic equipment may certainly also include the hardware required by other transactions.

The processor, the network interface, and the memory may be connected to each other through an internal bus, wherein the internal bus may be an ISA (Industry Standard Architecture) bus, a PCI (Peripheral Component Interconnect) bus or an EISA (Extended Industry Standard Architecture) bus, etc. The bus may be classified into an address bus, a data bus, a control bus, etc. For ease of presentation, only a double-headed arrow is used in FIG. 4, which, however, does not mean that there is only one bus or one type of bus.

The memory is used to store programs. For example, the programs may include program codes, and the program codes include computer operation instructions. The memory may include an internal memory and a non-volatile memory, and provides instructions and data to the processor.

The processor reads corresponding computer program from the non-volatile memory to the internal memory and then runs the computer program to form a blockchain consensus device at a logical level. The processor executes the programs stored in the memory, and is used to perform the following operations:

initiating, based on a consensus master node of a blockchain, a consensus proposal for at least one pending-consensus transaction in a transaction pool of the consensus master node, wherein the consensus proposal carries a transaction hash list, and the transaction hash list comprises a transaction hash of the at least one pending-consensus transaction;

matching and selecting, based on a target consensus backup node of the blockchain, the at least one pending-consensus transaction corresponding to the transaction hash list from a transaction pool of the target consensus backup node, wherein all consensus nodes of the blockchain have the same transaction hash calculation logic; and obtaining, based on the target consensus backup node, transaction information of the matched at least one pending-consensus transaction from the transaction pool of the target consensus backup node, thereby executing a process of the consensus proposal based on the transaction information.

It can be known from the electronic equipment shown in FIG. 4 that in the solutions of the embodiments of this specification, the consensus master node sends the transaction hash of the pending-consensus transaction to the consensus backup node in a consensus stage, replacing the original method of sending transaction information of the pending-consensus transaction to the consensus backup node. All transaction backup nodes may autonomously match transaction information of the pending-consensus transaction from respective transaction pools based on the transaction hash, thereby completing a consensus process. Since the data amount of the transaction hash is smaller than that of transaction information, the solutions of the embodiments of this specification may significantly reduce the time for data transmission and data analysis in the consensus process, thereby improving the consensus efficiency.

The above-mentioned blockchain consensus method disclosed by the embodiment shown in FIG. 1 of this specification is applicable on a processor or is implemented by the processor. The processor may be an integrated circuit chip with signal processing capability. During implementation, the steps of the above-described method may be completed by an integrated logic circuit of hardware in the processor or by instructions in a software form. The above-described processor may be a general-purpose processor, including CPU (Central Processing Unit), NP (Network Processor), etc, and may also be DSP (Digital Signal Processor), ASIC (Application Specific Integrated Circuit), FPGA (Field-Programmable Gate Array) or other programmable logic devices, discrete gate or transistor logic devices, discrete hardware components. The method, steps and logical block diagrams disclosed in the embodiments of this specification may be implemented or executed. The general-purpose processor may be a microprocessor or any conventional processor, etc. The steps of the method disclosed by the embodiments of this specification may be directly executed completely by a hardware decoding processor, or by a combination of hardware and software modules in the decoding processor. The software module may be located in a mature storage medium in the field, such as a random access memory, a flash memory, a read-only memory, a programmable read-only memory, an electrically erasable programmable memory and a register. The storage medium is located in the memory, and the processor reads information in the memory and implements the steps of the above-described method in conjunction with its hardware.

It should be appreciated that the electronic equipment according to the embodiments of this specification may achieve the functions of the above-mentioned blockchain consensus device embodiments shown in FIGS. 1 and 2, which will not be elaborated further herein.

In addition to the implementation manner by software, the electronic equipment in this specification does not exclude other implementation manners, such as by a logic device or a combination of software and hardware, etc. That is to say, the execution entity for the following process is not limited to various logic units, and may also be a hardware or logic device.

In addition, the embodiments of this specification also provide a computer-readable storage medium having one or more programs stored thereon, wherein the one or more programs include instructions; and when the instructions are executed by a portable electronic device comprising a plurality of applications, the portable electronic device may be caused to execute the method according to the embodiment shown in FIG. 1, and is used to implement the following steps:

initiating, based on a consensus master node of a blockchain, a consensus proposal for at least one pending-consensus transaction in a transaction pool of the consensus master node, wherein the consensus proposal carries a transaction hash list, and the transaction hash list comprises a transaction hash of the at least one pending-consensus transaction;

matching and selecting, based on a target consensus backup node of the blockchain, the at least one pending-consensus transaction corresponding to the transaction hash list from a transaction pool of the target consensus backup node, wherein all consensus nodes of the blockchain have the same transaction hash calculation logic; and obtaining, based on the target consensus backup node, transaction information of the matched at least one pending-consensus transaction from the transaction pool of the target consensus backup node, thereby executing a process of the consensus proposal based on the transaction information.

It should be appreciated that when the above-described instructions are executed by a portable electronic device comprising a plurality of applications, the above-described blockchain consensus device may be caused to achieve the functions according to the embodiments shown in FIGS. 1 and 2, which will not be repeated herein.

Those skilled in the art should understand that the embodiments of this specification may be provided as a method, a system or a computer program product. Therefore, this specification may adopt a form of complete hardware embodiments, complete software embodiments or embodiments described in conjunction with software and hardware. In addition, this specification may adopt a form of a computer program product implemented on one or more computer-usable storage media (including but not limited to disk memories, CD-ROM, optical memories, etc.) comprising computer-usable program codes.

Some embodiments of this specification are described above. Other embodiments fall within the protection scope of the appended claims. In some cases, the actions or steps stated in the claims may be performed in a sequence different from those in the embodiments and the desired result may still be achieved. In addition, the processes described in the accompanying drawings do not necessarily require the specific order or sequential order shown to achieve the desired result. In some implementation manners, multitasking and parallel processing are also feasible or may be advantageous.

What described above are just embodiments of this specification, and are not intended to limit this specification. For those skilled in the art, there may be various modifications and changes to this specification. Any modification, equivalent replacement, improvement and the like made within the spirit and principle of this specification shall fall within the protection scope of the claims of this specification.

What is claimed is:

1. A blockchain consensus method, comprising:
    updating, by a target consensus backup node of a blockchain, a transaction pool of the target consensus backup node by adding transaction information of a plurality of new transactions to the transaction pool;
    storing, by the target consensus backup node, mapping relationships between the new transactions and a plurality of transaction hashes of the new transactions;
    obtaining, by the target consensus backup node from a consensus master node of the blockchain, a consensus proposal comprising a list of transaction hashes corresponding to a plurality of pending-consensus transactions;
    matching, by the target consensus backup node, the list of transaction hashes in the consensus proposal with the plurality of transaction hashes associated with the mapping relationships;
    determining, by the target consensus backup node, whether the list of transaction hashes in the consensus proposal matches the plurality of transaction hashes associated with the mapping relationships;
    if one or more of the list of transaction hashes are not matched, performing, by the target consensus backup node, a waiting process for one or more of the plurality of pending-consensus transactions to be synchronized to the transaction pool of the target consensus backup node and rematching of the one or more of the list of transaction hashes with the plurality of transaction hashes associated with the mapping relationships by at least:
        marking one or more matched transaction hashes in the transaction hash list, wherein each of the one or more matched transaction hashes corresponds to one of the plurality of pending-consensus transactions; and
        matching, from the transaction pool of the target consensus backup node, transaction hashes of pending-consensus transactions corresponding to unmarked transaction hashes in the transaction hash list;
    in response to the list of transaction hashes being matched with at least some of the plurality of transaction hashes associated with the mapping relationships, obtaining, by the target consensus backup node from the transaction pool of the target consensus backup node, transaction information of matched new transactions corresponding to the plurality of pending-consensus transactions; and
    executing, by the target consensus backup node, a process of the consensus proposal based on the obtained transaction information.

2. The method according to claim 1, wherein the waiting process and the rematching are performed iteratively until reaching a number of rematch count.

3. The method according to claim 2, wherein the method further comprises:
    if the one or more of the list of transaction hashes are not matched after reaching the number of rematch count, sending, by the target consensus backup node to the consensus master node, a transaction synchronization request, wherein the transaction synchronization request comprises the one or more of the list of transaction hashes not being matched;
    receiving, by the target consensus backup node, a transaction synchronization response from the consensus master node, wherein the transaction synchronization response comprises transaction information of one or more target pending-consensus transactions corresponding to the one or more of the list of transaction hashes not being matched;
    validating, by the target consensus backup node, the transaction information of the one or more target pending-consensus transactions in the transaction synchronization response; and
    adding, by the target consensus backup node, the transaction information of the one or more target pending-consensus transactions to the transaction pool of the target consensus backup node.

4. The method according to claim 1, wherein the waiting process comprises:
    delaying for a rematch time interval before the rematching.

5. The method according to claim 1, wherein matching, from the transaction pool of the target consensus backup node, the pending-consensus transactions corresponding to the unmarked transaction hashes in the transaction hash list comprises:

matching, from the transaction pool of the target consensus backup node, only the pending-consensus transactions corresponding to the unmarked transaction hashes in the transaction hash list.

6. The method according to claim 1, wherein:
adding the transaction information of the plurality of the new transactions to the transaction pool of the target consensus backup node comprises calculating the plurality of transaction hashes of the new transactions based on a transaction hash calculation logic; and
the matching the list of transaction hashes in the consensus proposal with the plurality of transaction hashes associated with the mapping relationships comprises:
matching the list of transaction hashes with the stored mapping relationships.

7. The method according to claim 1, wherein the consensus master node, the target consensus backup node, and other consensus backup nodes are configured to perform consensus varification on the consensus proposal based on a Practical Byzantine Fault Tolerance algorithm.

8. The method according to claim 1, further comprising:
obtaining, by the target consensus backup node, the list of transaction hashes from the consensus master node through a pre-prepare message in a pre-prepare stage of a consensus protocol that is based on Practical Byzantine Fault Tolerance.

9. A blockchain-based system comprising one or more processors and one or more non-transitory computer-readable memories coupled to the one or more processors and configured with instructions executable by the one or more processors to cause the system to perform operations comprising:
updating a transaction pool of a target consensus backup node by adding transaction information of a plurality of new transactions to the transaction pool;
storing mapping relationships between the new transactions and a plurality of transaction hashes of the new transactions;
obtaining, from a consensus master node of a blockchain, a consensus proposal comprising a list of transaction hashes corresponding to a plurality of pending-consensus transactions;
matching the list of transaction hashes in the consensus proposal with the plurality of transaction hashes associated with the mapping relationships;
determining whether the list of transaction hashes in the consensus proposal matches the plurality of transaction hashes associated with the mapping relationships;
if one or more of the list of transaction hashes are not matched, performing a waiting process for one or more of the plurality of pending-consensus transactions to be synchronized to the transaction pool of the target consensus backup node and rematching of the one or more of the list of transaction hashes with the plurality of transaction hashes associated with the mapping relationships by at least:
marking one or more matched transaction hashes in the transaction hash list, wherein each of the one or more matched transaction hashes corresponds to one of the plurality of pending-consensus transactions; and
matching, from the transaction pool of the target consensus backup node, transaction hashes of pending-consensus transactions corresponding to unmarked transaction hashes in the transaction hash list;
in response to the list of transaction hashes being matched with at least some of the plurality of transaction hashes associated with the mapping relationships, obtaining, from the transaction pool of the target consensus backup node, transaction information of matched new transactions corresponding to the plurality of pending-consensus transactions; and
executing a process of the consensus proposal based on the obtained transaction information.

10. The blockchain-based system of claim 9, wherein the waiting process and the rematching are performed iteratively until reaching a number of rematch count.

11. The blockchain-based system of claim 10, wherein the operations further comprise:
if the one or more of the list of transaction hashes are not matched after reaching the number of rematch count, sending, to the consensus master node, a transaction synchronization request, wherein the transaction synchronization request comprises the one or more of the list of transaction hashes not being matched;
receiving a transaction synchronization response from the consensus master node, wherein the transaction synchronization response comprises transaction information of one or more target pending-consensus transactions corresponding to the one or more of the list of transaction hashes not being matched;
validating the transaction information of the one or more target pending-consensus transactions in the transaction synchronization response; and
adding the transaction information of the one or more target pending-consensus transactions to the transaction pool of the target consensus backup node.

12. The blockchain-based system of claim 9, wherein the waiting process comprises:
delaying for a rematch time interval before the rematching.

13. The blockchain-based system of claim 9, wherein matching, from the transaction pool of the target consensus backup node, the pending-consensus transactions corresponding to the unmarked transaction hashes in the transaction hash list comprises:
matching, from the transaction pool of the target consensus backup node, only the pending-consensus transactions corresponding to the unmarked transaction hashes in the transaction hash list.

14. The blockchain-based system of claim 9, wherein:
adding the transaction information of the plurality of the new transactions to the transaction pool of the target consensus backup node comprises calculating the plurality of transaction hashes of the new transactions based on a transaction hash calculation logic; and
the matching the list of transaction hashes in the consensus proposal with the plurality of transaction hashes associated with the mapping relationships comprises:
matching the list of transaction hashes with the stored mapping relationships.

15. A non-transitory computer-readable storage medium configured with instructions executable by one or more processors to cause the one or more processors to perform operations comprising:
updating a transaction pool of a target consensus backup node by adding transaction information of a plurality of new transactions to the transaction pool;
storing mapping relationships between the new transactions and a plurality of transaction hashes of the new transactions;
obtaining, from a consensus master node of a blockchain, a consensus proposal comprising a list of transaction hashes corresponding to a plurality of pending-consensus transactions;

matching the list of transaction hashes in the consensus proposal with the plurality of transaction hashes associated with the mapping relationships;

determining whether the list of transaction hashes in the consensus proposal matches the plurality of transaction hashes associated with the mapping relationships;

if one or more of the list of transaction hashes are not matched, performing a waiting process for one or more of the plurality of pending-consensus transactions to be synchronized to the transaction pool of the target consensus backup node and rematching of the one or more of the list of transaction hashes with the plurality of transaction hashes associated with the mapping relationships by at least:

marking one or more matched transaction hashes in the transaction hash list, wherein each of the one or more matched transaction hashes corresponds to one of the plurality of pending-consensus transactions; and matching, from the transaction pool of the target consensus backup node, transaction hashes of pending-consensus transactions corresponding to unmarked transaction hashes in the transaction hash list;

in response to the list of transaction hashes being matched with at least some of the plurality of transaction hashes associated with the mapping relationships, obtaining, from the transaction pool of the target consensus backup node, transaction information of matched new transactions corresponding to the plurality of pending-consensus transactions; and executing a process of the consensus proposal based on the obtained transaction information.

16. The non-transitory computer-readable storage medium of claim 15, wherein the waiting process and the rematching are performed iteratively until reaching a number of rematch count.

17. The non-transitory computer-readable storage medium of claim 16, wherein the operations further comprise:

if the one or more of the list of transaction hashes are not matched after reaching the number of rematch count, sending, to the consensus master node, a transaction synchronization request, wherein the transaction synchronization request comprises the one or more of the list of transaction hashes not being matched;

receiving a transaction synchronization response from the consensus master node, wherein the transaction synchronization response comprises transaction information of one or more target pending-consensus transactions corresponding to the one or more of the list of transaction hashes not being matched;

validating the transaction information of the one or more target pending-consensus transactions in the transaction synchronization response; and adding the transaction information of the one or more target pending-consensus transactions to the transaction pool of the target consensus backup node.

18. The non-transitory computer-readable storage medium of claim 15, wherein matching, from the transaction pool of the target consensus backup node, the pending-consensus transactions corresponding to the unmarked transaction hashes in the transaction hash list comprises:

matching, from the transaction pool of the target consensus backup node, only the pending-consensus transactions corresponding to the unmarked transaction hashes in the transaction hash list.

19. The non-transitory computer-readable storage medium of claim 15, wherein the operations further comprise:

adding the transaction information of the plurality of the new transactions to the transaction pool of the target consensus backup node comprises calculating the plurality of transaction hashes of the new transactions based on a transaction hash calculation logic; and the matching the list of transaction hashes in the consensus proposal with the plurality of transaction hashes associated with the mapping relationships comprises:

matching the list of transaction hashes with the stored mapping relationships.

20. The non-transitory computer-readable storage medium of claim 15, wherein the consensus master node, the target consensus backup node, and other consensus backup nodes are configured to perform consensus varification on the consensus proposal based on a Practical Byzantine Fault Tolerance algorithm.

* * * * *